United States Patent [19]

Lee

[11] Patent Number: 5,319,201
[45] Date of Patent: Jun. 7, 1994

[54] PROXIMITY DETECTOR

[75] Inventor: Mark A. Lee, Camberley, England

[73] Assignee: The Proximeter Company Limited, London, England, Great Britain

[21] Appl. No.: 828,552

[22] Filed: Jan. 31, 1992

[30] Foreign Application Priority Data

Feb. 12, 1991 [IE] Ireland .................................. 477/91

[51] Int. Cl.⁵ .............................................. G08B 13/19
[52] U.S. Cl. .................................. 250/349; 250/338.1
[58] Field of Search ........................ 367/112, 116, 903; 250/338.1, 341, 349

[56] References Cited

U.S. PATENT DOCUMENTS

| 4,240,152 | 12/1980 | Duncan et al. | 367/112 X |
| 4,528,563 | 7/1985 | Takeuchi | 367/112 X |
| 4,561,064 | 12/1985 | Brüggen et al. | 367/116 X |
| 4,868,901 | 9/1989 | Kniskern et al. | 250/222.2 |
| 4,967,083 | 10/1990 | Kornbrekke et al. | 250/341 |

FOREIGN PATENT DOCUMENTS 2139887 2/1973 Fed. Rep. of Germany .
3518613A1 11/1985 Fed. Rep. of Germany .
2051356 5/1979 United Kingdom .
2214290A 8/1989 United Kingdom .
2214290 8/1989 United Kingdom .

Primary Examiner—Constantine Hannaher
Assistant Examiner—Edward J. Glick
Attorney, Agent, or Firm—Finnegan, Henderson, Farabow, Garrett & Dunner

[57] ABSTRACT

A proximity detector for motor cars, to aid parking, has 3 infra-red transmitter units 10-1 to 10-3 producing a zone of radiation 36 and two receiver units 20-1 and 20-2 producing a zone 46 of sensitivity to the radiation. Each transmitter unit comprises 3 transmitter elements housed behind a common aperture, and each receiver unit comprises 2 receiver elements housed behind a common aperture, giving for each unit a polar diagram with at least two distinct directions of high magnitude, the axes of peak radiation or sensitivity from the elements of a unit being divergent through the aperture and forming the directions of high magnitude. An indicator indicates the amplitude of the combined signal from the receivers by providing a pulsed tone the pulse frequency of which is varied.

1 Claim, 2 Drawing Sheets

PROXIMITY DETECTOR

BACKGROUND OF THE INVENTION

The present invention relates to proximity detectors, and finds particular application to motor vehicles for indicating to their drivers their proximity to objects such as adjacent vehicles when parking.

GB 2 214 290 describes a system of this kind. An infrared transmitter and an infrared receiver are attached to suitably spaced apart points on the bumper of a vehicle. The transmitter produces a divergent beam zone which we can conveniently take as roughly conical, and the receiver is sensitive to a similarly divergent zone which we can also take as roughly conical. The transmitter and receiver are skewed slightly towards each other so that the two cones cross each other. A sounder unit produces a sound of intensity dependent on the strength of the signal from the receiver.

Suppose that the vehicle is being parked against some fixed object such as another vehicle. The conical beam from the transmitter will illuminate a roughly circular area on the fixed object, and the receiver will be sensitive to light received from a roughly circular area on the object. The vehicle will initially be at a considerable distance from the fixed object, and the two circular areas on the object will have relative little overlap. The receiver signal will therefore be small. As the vehicle moves closer to the fixed object, so the two circular areas will move towards each other (reducing in size at the same time), so that the signal will increase. Eventually, however, the two circular areas will coincide, and as the vehicle continues to move closer to the fixed object, so the circular areas will gradually move apart again. The signal will therefore reduce again, reaching zero when the separation of the circular areas is complete. The driver can thus stop at an accurately controlled distance from the fixed object, by stopping as soon as the signal from the sounder unit drops in volume.

One disadvantage of this system is that if the fixed object is small, the system will be detected only if it is within the area of overlap of the two zones or cones of the transmitter and the receiver. Thus, if the range of operation is say between 30 and 5 cm, the area of object to which the system is sensitive will be of the same order of size (around 30 cm). Collisions with small fixed objects will thus be likely to occur if the object is displaced to one or other side of the system by more than say about 20 cm.

One object of the present invention is to overcome this disadvantage of the system of GB 2 214 290.

SUMMARY OF THE INVENTION

According to one aspect the present invention provides a proximity detecting system comprising transmitter means producing a zone of radiation, receiver means producing a zone of sensitivity to the radiation, the receiver and transmitter means having their zones intersecting at a position off the line between the transmitter and receiver, and indicating means indicating the amplitude of the signal from the line joining them, wherein there are at least three transmitter and receiver units alternating along the line and respectively forming the transmitter and receiver means.

Preferably the zones of the transmitter means and the receiver means are both divergent and the receiver and transmitter are spaced apart and have their zones intersecting at a position off the line between the transmitter and receiver.

Preferably at least one type of unit has a polar diagram with at least two distinct directions of high magnitude approximately coplanar with the line of units. This can conveniently be achieved by constructing each such unit from a plurality of elements behind a common aperture, the axis from each element through the aperture forming one of the directions of high magnitude.

The system preferably uses infrared radiation, although other forms of radiation could be used.

It will be noted that the system does not use any mirrors or lenses, and has no moving parts. The size, reflectively, and colour of the fixed object will obviously affect the amplitude of the receiver signal. However, this will not affect the operation and use of the system, because whatever the size, reflectivity, and colour of the fixed object may be, the peak signal amplitude will occur at substantially the same distance from the system, and it is the peaking of the signal, not its absolute amplitude, which is used by the driver to determine when to stop the vehicle.

The present system uses a plurality of transmitting and receiving units, in contrast to the known system, and each of the present units preferably includes a plurality of elements, as noted above. The present system, therefore, detects objects at a greater distance than the known system does, for comparable elements and circuitry.

According to another aspect the present invention provides a proximity detecting system comprising transmitter means producing a zone of radiation, receiver means producing a zone of sensitivity to the radiation, the receiver and transmitter means having their zones intersecting at a position off the line between the transmitter and receiver, and indicating means indicating the amplitude of the signal from the line joining them by means of a pulsed tone the pulse frequency of which is varied.

BRIEF DESCRIPTION OF THE DRAWINGS

A proximity detecting system embodying the invention will now be described, by way of example, with reference to the drawings, in which.

DETAILED DESCRIPTION OF THE INVENTION

Figure 1:
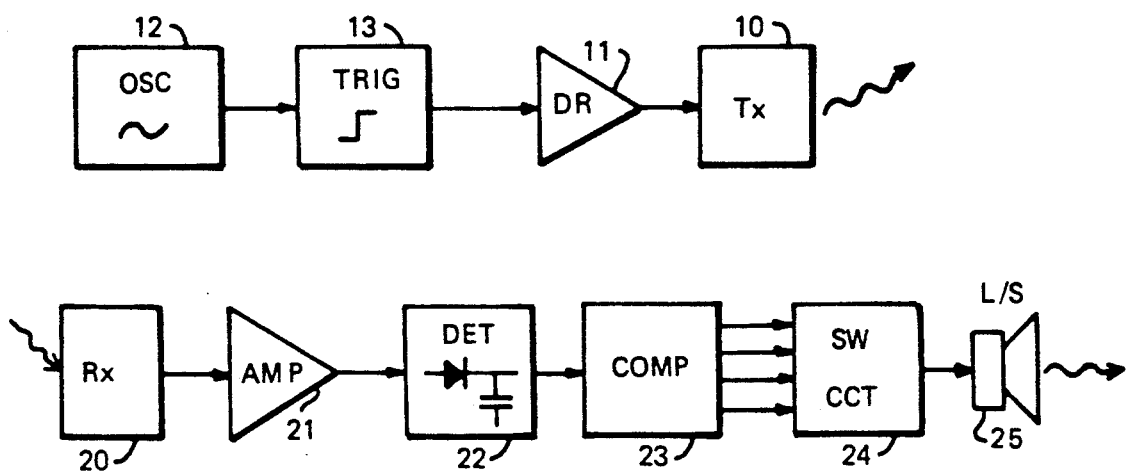
FIG. 1 is an electrical block diagram of the system.

Referring to FIG. 1, there is a set of IR transmitters 10 which are pulse driven by a fast switching power driver 11 which is in turn driven by an oscillator 12 via an on edge trigger 13. There is also a set of IR receivers 20 feeding a high gain analog amplifier 21 (which may be a chopper amplifier synchronized with the oscillator 12) which in turn feeds an AC to DC converter (detector) 22. The output of the IR transmitters 10 is pulsed by the oscillator 10, and the output of the receivers 20 is similarly pulsed; the converter 22 converts this pulsed signal to a steady one.

The converter 22 feeds a comparator unit 23 which quantizes the signal, i.e. determines which of a set of bands its amplitude falls in. The unit 23 feeds a sounder (speaker) 25 via a sounder speed switching circuit 24 which energizes the sounder at a rate dependent on which of the outputs from unit 23 is energized.

As will be discussed below, the proximity detector system is intended for attachment to a motor vehicle such as a car. As the car is moved towards a fixed object (e.g. when parking), the amplitude of the signal from the receivers 20 rises to a peak and then falls again as the car steadily approaches the object. The rate of fall off of the amplitude of the signal is much greater than the rate of rise. The final sound warning the driver to stop is activated as the signal is increasing in amplitude and remains on until the signal peaks and falls. The driver will stop the car before fall off occurs. For example the final signal activates at say 4.8 volts and the signal peaks at 6.5 volts and then falls off only when very close to the object. The system is preferably a 12 V system which can be energized from a car battery.

The signal level at which the first output of the comparator 23 is energized can be set at substantially zero, so that a pulsed tone at low rate indicates that the system is switched on. The pulse frequency may then increase through two intermediate steps to a final rate at which the tone is continuous. This pulsed tone is more readily interpreted by the driver than a continuous tone of varying intensity.

The signal level at which the first output of the comparator 23 is energized can alternatively be set at a level above that produced by ambient IR and reflections from remote objects, so that the system can be left permanently energized if desired.

The receiver chain may include a potentiometer (not shown) for adjustably attenuating the received signal before it is quantized, to vary the sensitivity of the system and thus the distances at which an object is detected and the various outputs from the converter 22 are energized.

Figure 2:
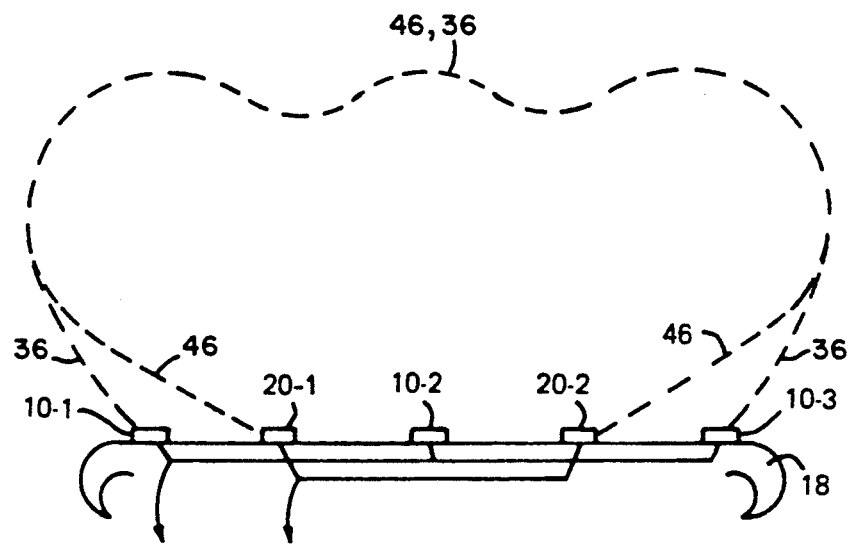
FIG. 2 is a diagram showing the arrangement of the transmitting and receiving units.

Referring now to FIG. 2, the transmitter means comprise three transmitter units 10-1 to 10-3, driven in parallel, and the receiver means comprise two receiver units 20-1 and 20-2, feeding the amplifier 2 via a summing network (not shown). These five units are attached at equal intervals along a vehicle bumper 18 as shown.

Figure 4:
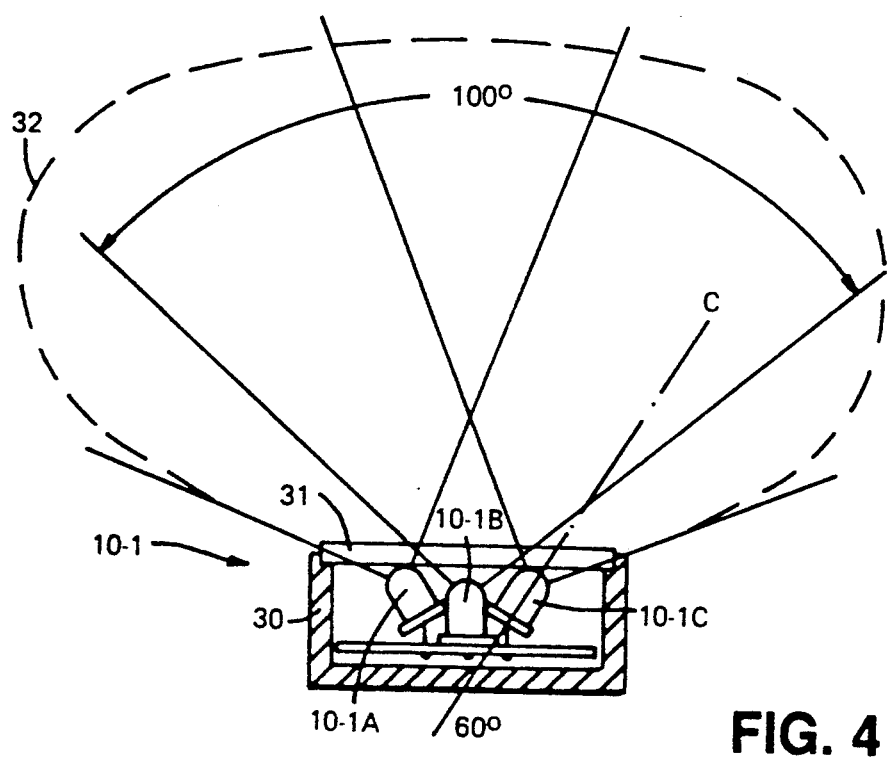

FIG. 4 shows the construction of the transmitter unit 10-1; the construction of units 10-2 and 10-3 is the same. Unit 10-1 consists of a casing 30 with an IR-transparent cover 31, and containing three IR transmitter elements 10-1A, 10-1B, and 10-1C.

Each of these elements has a zone of transmission of roughly 100°, as indicated for element 10-1B, and the elements are arranged with their axes at roughly 30° to each other, as shown for elements 10-1B an 10-1C. The polar diagram for each individual element is a lobe with a maximum width of 100° and which is generally fairly flat between those limits, though of course diminishing towards the limits. The overall polar diagram for the unit, i.e. for the three elements combined, is roughly as indicated by the broken line 32. It will be noted that the centre of this curve is less than its maximum; it has two maxima, at very roughly ±30° from its central axis.

Figure 3:
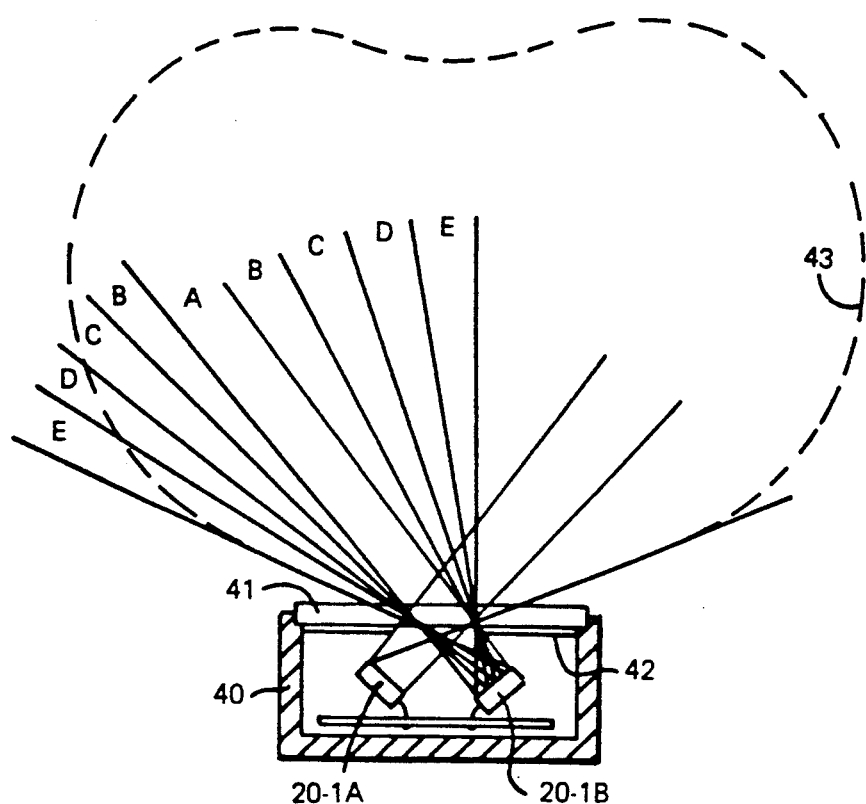
FIGS. 3 and 4 are diagrams of the construction of individual transmitting and receiving units

FIG. 3 shows the construction of the receiver unit 20-1; the construction of unit 20-2 is the same. Unit 20-1 consists of a casing 40 with an IR-transparent cover 41, and containing two IR receiver elements 20-1A and 20-1B. There is an aperture formed on the inner face of the cover 41 by a mask 42.

Various rays tangent to the edges of the aperture are drawn to element 20-1B. It will be seen that rays falling within the angular sector A and passing through the aperture will all strike the element 20-1B, while for sectors B to E (moving away from sector A in either direction), progressively fewer rays passing through the aperture will fall on the element 20-1B. Each of the elements 20-1A and 20-1B therefore has a polar sensitivity diagram which is strongly peaked along its axis. The overall polar diagram for the unit, i.e. for the two elements combined, is roughly as indicated by the broken line 43. It will be noted that the centre of this curve is substantially less than its maximum; it has two maxima, at very roughly ±30° from its central axis.

Returning to FIG. 2, the radiation patterns for the three transmitter units will of course combine to give a total radiation pattern, and the sensitivity patterns for the two receiver units will of course combine similarly. It is not possible to give true polar diagrams for these combinations, because the separation between the sources is comparable with the distances at which the intensities are being measured. However, the curves 36 and 46 give an indication of the patterns of the intensity of the IR radiation from the transmitter means and the sensitivity of the receiver means respectively.

It will be seen that the two patterns are both roughly uniform along a distance which is roughly equal to the length of the bumper 18. The sensitivity of the system is therefore largely constant for fixed objects at any position opposite the bumper 18.

In fact, the curves 36 and 46 have some undulations. However, it will be seen that the concavities of the one curve are roughly matched by convexities of the other, so the two roughly cancel out, giving an overall sensitivity which is closer to uniformity.

The uniformity of sensitivity arises from the use of a plurality of transmitter and receiver units, and from the shaping of the polar diagrams of the individual units to have a reduction along the main axis. This in turn arises from the design of the transmitter and receiver units, using a plurality of elements with divergent axes. This shaping of the polar diagrams of the individual units also allows the spacing between the units to be large, i.e. the number of units to be small.

I claim:

1. A proximity detecting system comprising transmitter means producing a zone of radiation, receiver means having a zone of sensitivity to the radiation intersecting with the zone of radiation of the transmitter means, the transmitter means emitting and the receiver means being sensitive to infrared radiation, and indicating means indicating the amplitude of the signal from the receiver means by means of a pulsed tone the pulse frequency of which is varied, the transmitter and receiver means together comprising at least three units spaced along a line with the units being alternately transmitter units and receiver units, the zones of the transmitter units and the receiver units both being divergent and the receiver and transmitter units being spaced substantially equally along said line of units, wherein at least one type of unit has a polar diagram with at least two distinct directions of high magnitude approximately coplanar with the line of units and each such unit is constructed from a plurality of elements behind a common aperture, the axis from each element through the aperture forming one of the directions of high magnitude.

* * * * *